United States Patent
Kyhm et al.

(10) Patent No.: US 12,276,611 B2
(45) Date of Patent: Apr. 15, 2025

(54) METHOD AND SYSTEM FOR APPRAISING GENUINE PRODUCT USING QUANTUM DOT

(71) Applicant: Pusan National University Industry-University Cooperation Foundation, Busan (KR)

(72) Inventors: Kwang Seuk Kyhm, Busan (KR); Seung Hwan Lee, Busan (KR); Jin Woo Kim, Busan (KR)

(73) Assignee: Pusan National University Industry-University Cooperation Foundation, Busan (KR)

(*) Notice: Subject to any disclaimer, the term of this patent is extended or adjusted under 35 U.S.C. 154(b) by 203 days.

(21) Appl. No.: 18/094,389

(22) Filed: Jan. 8, 2023

(65) Prior Publication Data

US 2023/0358679 A1    Nov. 9, 2023

(30) Foreign Application Priority Data

May 4, 2022    (KR) .......................... 10-2022-0055445

(51) Int. Cl.
   *G01N 21/64*    (2006.01)
(52) U.S. Cl.
   CPC .................. *G01N 21/6456* (2013.01); *G01N 2201/06113* (2013.01)
(58) Field of Classification Search
   CPC ..... G01N 21/6456; G01N 2201/06113; G01N 21/6458; G01N 21/6489; G01N 21/6428; G01N 2021/6421; G01N 2021/6423; G07D 7/12; G07D 7/1205; G01B 11/026
   See application file for complete search history.

(56) References Cited

U.S. PATENT DOCUMENTS

| | | | |
|---|---|---|---|
| 2002/0021003 A1 | 2/2002 | McGrew | |
| 2014/0014715 A1* | 1/2014 | Moran | G06K 19/06196 |
| | | | 235/375 |
| 2021/0120193 A1* | 4/2021 | Swager | G01J 5/02 |
| 2021/0293714 A1 | 9/2021 | Matoba et al. | |

FOREIGN PATENT DOCUMENTS

| | | | |
|---|---|---|---|
| JP | 2007-127639 A | 5/2007 | |
| KR | 10-1341620 B1 | 12/2013 | |
| KR | 10-2015-0063309 A | 6/2015 | |
| KR | 10-1703914 B1 | 2/2017 | |
| KR | 10-1759247 B1 | 7/2017 | |
| KR | 10-1905416 B1 | 10/2018 | |
| KR | 10-2020-0043451 A | 4/2020 | |
| WO | WO-2022053828 A1 * | 3/2022 | ............. B42D 25/29 |

* cited by examiner

*Primary Examiner* — Dani Fox
*Assistant Examiner* — Mamadou Faye
(74) *Attorney, Agent, or Firm* — Park, Kim & Suh, LLC (57) ABSTRACT

Disclosed is a method of appraising a genuine product using a quantum dot which includes obtaining image data for fluorescence generated from a target product and a quantum dot layer located in one region of the target product by laser light; determining a relative height and a relative distance between target quantum dots constituting the quantum dot layer by using the image data for the fluorescence, and generating a quantum dot arrangement map; and determining whether the target product is genuine by comparing the quantum dot arrangement map with a previously stored reference quantum dot arrangement map.

13 Claims, 6 Drawing Sheets

METHOD AND SYSTEM FOR APPRAISING GENUINE PRODUCT USING QUANTUM DOT

CROSS-REFERENCE TO RELATED APPLICATIONS

This application claims priority under 35 U.S.C. § 119 to Korean Patent Application No. 10-2022-0055445 filed on May 4, 2022, in the Korean Intellectual Property Office, the disclosures of which are incorporated by reference herein in their entireties.

STATEMENT REGARDING GOVERNMENT SPONSORED RESEARCH OR DEVELOPMENT

The inventive concept is derived from research conducted as part of the Ministry of Education's four-step Brain Korea 21 Project (R&D) (Project Serial No.: 1345334975, Project No.: 5120200613711, Research project name: Cognitive Mechatronics-Based Personalized Healthcare Education Research Group, project management institution: National Research Foundation of Korea, Task performing institution: Pusan National University, and Research period: 2022 May 1~2023 Feb. 28) and the Ministry of Science and ICT's support for the spread of talent utilization (Project Serial No.: 1711195612, Project No.: 00236798, Research project name: Quantum-Bio Convergence Nanophotonics International Joint Research Center, Project management institution: National Research Foundation of Korea, Task performing institution: Pusan National University Industry-Academic Cooperation Foundation, and Research period: 2023 Apr. 1~2023 Dec. 31). Meanwhile, there is no property interest of the Korean government in any aspect of the inventive concept.

BACKGROUND

Embodiments of the present disclosure described herein relate to a method and system for appraising a genuine product using quantum dots.

As the economic scale of the market for a field grows, it is common that the appearance of counterfeit or replica products increases.

Accordingly, various technologies such as carbon dating, Raman spectroscopy, handwriting analysis, and the like are currently used to distinguish and appraise genuine products from counterfeit or replica products.

Meanwhile, the method of appraising a genuine product using the above technology basically can be directly contacted with the surface of the target object, so there is a risk of damage. Alternatively, because the entire object must be observed and it must be determined whether the object is forged, efficiency is low, and because expensive equipment is used, economic feasibility is low in terms of cost.

In addition, there is ambiguity in the appraisal of a genuine product because it relies only on the opinions of experts. Further, as counterfeiting technology becomes more sophisticated, it is difficult to appraise a genuine product.

Accordingly, there is a need to provide a technology for appraising a genuine product that does not damage a target object and has economic feasibility, high accuracy, and convenience.

SUMMARY

Embodiments of the present disclosure provide a method and system for appraising a genuine product using quantum dots capable of performing genuine appraisal using quantum dots without damaging a target object by using a quantum dot solution.

According to an embodiment, a method of appraising a genuine product using a quantum dot by a genuine product appraisal system using a quantum dot which includes at least one processor, includes obtaining, by the at least one processor, image data for fluorescence generated from a target product and a quantum dot layer located in one region of the target product by laser light; determining, by the at least one processor, a relative height and a relative distance between target quantum dots constituting the quantum dot layer by using the image data for the fluorescence, and generating a quantum dot arrangement map; and determining, by the at least one processor, whether the target product is genuine by comparing the quantum dot arrangement map with a previously stored reference quantum dot arrangement map.

According to an embodiment, the image data for the fluorescence may include three-dimensional (3D) spatial image data including three-dimensional images of the fluorescence generated from the target product and the quantum dot layer; and two-dimensional (2D) plane image data including a 2D image for the fluorescence generated from the quantum dot layer.

According to an embodiment, the generating of the quantum dot arrangement map may include measuring, by the at least one processor, a wavelength value of the fluorescence in the 3D spatial image data; distinguishing, by the at least one processor, the fluorescence generated from the target product and the fluorescence generated from the quantum dot layer by using the wavelength value; and setting, by the at least one processor, a plane including the fluorescence generated from the target product as a target plane.

According to an embodiment, the determining of the relative height may include comparing, by the at least one processor, heights of a plurality of fluorescence generated from the quantum dot layer based on the target plane; and determining, by the at least one processor, relative heights between a plurality of target quantum dots corresponding to the plurality of fluorescence based on the compared heights.

According to an embodiment, the determining of the relative distance may include measuring, by the at least one processor, a first fluorescence intensity from each of the plurality of fluorescence in an arbitrary X-axis direction in the 2D plane image data; measuring, by the at least one processor, a second fluorescence intensity from each of the plurality of fluorescence in an Y-axis direction orthogonal to the X-axis in the 2D plane image data; and determining, by the at least one processor, as a center point of each of the plurality of target quantum dots, a point where a straight line extending an X value having a maximum value of the first fluorescence intensity in the Y-axis direction and a straight line extending an Y value having a maximum value of the second fluorescence intensity in the X-axis direction intersect.

According to an embodiment, the determining of the relative distance may include connecting, by the at least one processor, center points with a straight line; measuring, by the at least one processor, a length of the straight line; and determining, by the at least one processor, the length as the relative distance.

According to an embodiment, the generating of the quantum dot arrangement map may include arranging, by the at least one processor, a plurality of target quantum dots on an arbitrary 2D plane according to the relative distance; numbering, by the at least one processor, the plurality of arranged target quantum dots according to the relative height; and generating, by the at least one processor, the quantum dot arrangement map by connecting the plurality of target quantum dots with a straight line.

According to an embodiment, the previously stored reference quantum dot arrangement map may be generated by using the image data for the fluorescence generated from the genuine product and a quantum dot layer located in one region of the genuine product by the at least one processor.

According to an embodiment, the determining of whether the target product is genuine may include comparing, by the at least one processor, a relative distance between the plurality of target quantum dots constituting the quantum dot arrangement map and a relative distance between a plurality of reference quantum dots constituting the reference quantum dot arrangement map; and comparing, by the at least one processor, a relative height between the plurality of target quantum dots constituting the quantum dot arrangement map and a relative height between the plurality of reference quantum dots constituting the reference quantum dot arrangement map.

According to an embodiment, the determining of whether the target product is genuine may include determining, by the at least one processor, the target product as the genuine product when the relative distance between the plurality of target quantum dots is equal to the relative distance between the plurality of reference quantum dots corresponding to the plurality of target quantum dots.

According to an embodiment, the determining of whether the target product is genuine may include determining, by the at least one processor, the target product as a counterfeit product when the relative distance between the plurality of target quantum dots is different from the relative distance between the plurality of reference quantum dots corresponding to the plurality of target quantum dots.

According to an embodiment, the determining of whether the target product is genuine may include determining, by the at least one processor, the target product as a counterfeit product when the relative height between the plurality of target quantum dots is different from at least one of relative heights between the plurality of reference quantum dots corresponding to the plurality of target quantum dots.

According to an embodiment, a system for appraising a genuine product using a quantum dot includes at least one processor, wherein the at least one processor includes an input unit configured to receive image data for fluorescence generated from a target product and a quantum dot layer located in one region of the target product by laser light; a relative height determining unit configured to determine a relative height between target quantum dots constituting the quantum dot layer by using the image data; a distance calculating unit configured to calculate a relative distance between the target quantum dots by using the image data; a quantum dot arrangement map generating unit configured to generate a quantum dot arrangement map expressing an arrangement structure of the target quantum dots by using the relative height and the relative distance; and a control unit configured to compare the quantum dot arrangement map with an arrangement structure of a previously stored reference quantum dot arrangement map to determine whether the target product is genuine.

According to an embodiment, there is provided a computer-readable non-transitory recording medium on which a program for executing the method of appraising a genuine product using a quantum dot is recorded.

The method and system for appraising a genuine product using quantum dots according to the present disclosure perform the appraisal of a genuine product by using the quantum dot solution, so there is little risk of damage because laser light is not directly irradiated on the surface of the target product.

In addition, the method and system for appraising a genuine product using quantum dots according to the present disclosure may not need to appraise the entire object by coating some areas of the object with the quantum dot solution, and may reduce the time required for the appraisal of a genuine product by appraising only a partial area coated with the quantum dot solution.

In addition, the method and system for appraising a genuine product using quantum dots according to the present disclosure may guarantee authenticity by simply coating the quantum dot solution, so that it is possible to reduce the cost in terms of economy compared to an existing method for appraising a genuine product.

In addition, the method and system for appraising a genuine product using quantum dots according to the present disclosure may arrange the plurality of quantum dots included in the quantum dot solution according to an infinite number of cases, so that it is possible to improve the accuracy of the appraisal of a genuine product.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, various embodiments of the present disclosure will be described in detail with reference to the accompanying drawings, so that those skilled in the art can easily carry out the present disclosure. However, the present disclosure is not limited to the embodiments set forth herein and may be modified variously in many different forms.

The portions irrelevant to the description will not be shown in order to make the present disclosure clear. The same or similar elements may be marked by the same or similar reference numerals throughout the specification. Therefore, the reference numerals described above may also be used in other drawings.

In addition, because the size and thickness of each component shown in the drawings are arbitrarily shown for convenience of description, the present disclosure is not necessarily limited to those shown. In the drawing, the thickness may be exaggerated to clearly express various layers and regions.

In addition, the expression "the same" in the description may mean "substantially the same". That is, it may be the same to the extent that those skilled in the art can understand that it is the same. Other expressions may also be expressions in which the term "substantially" is omitted.

In addition, when some part 'includes' some elements, unless explicitly described to the contrary, it means that other elements may be further included but not excluded. The term "unit" or "module", as used in the specification, refers to software or a hardware component, such as an FPGA or ASIC, which perform functions. However, the term "unit" or "module" is not limited to software or hardware. The "unit" or "module" may be configured to be included in an addressable storage medium and to play one or more processors. Hereinafter, embodiments of the present disclosure will be described in detail with reference to the drawings.

Figure 1:
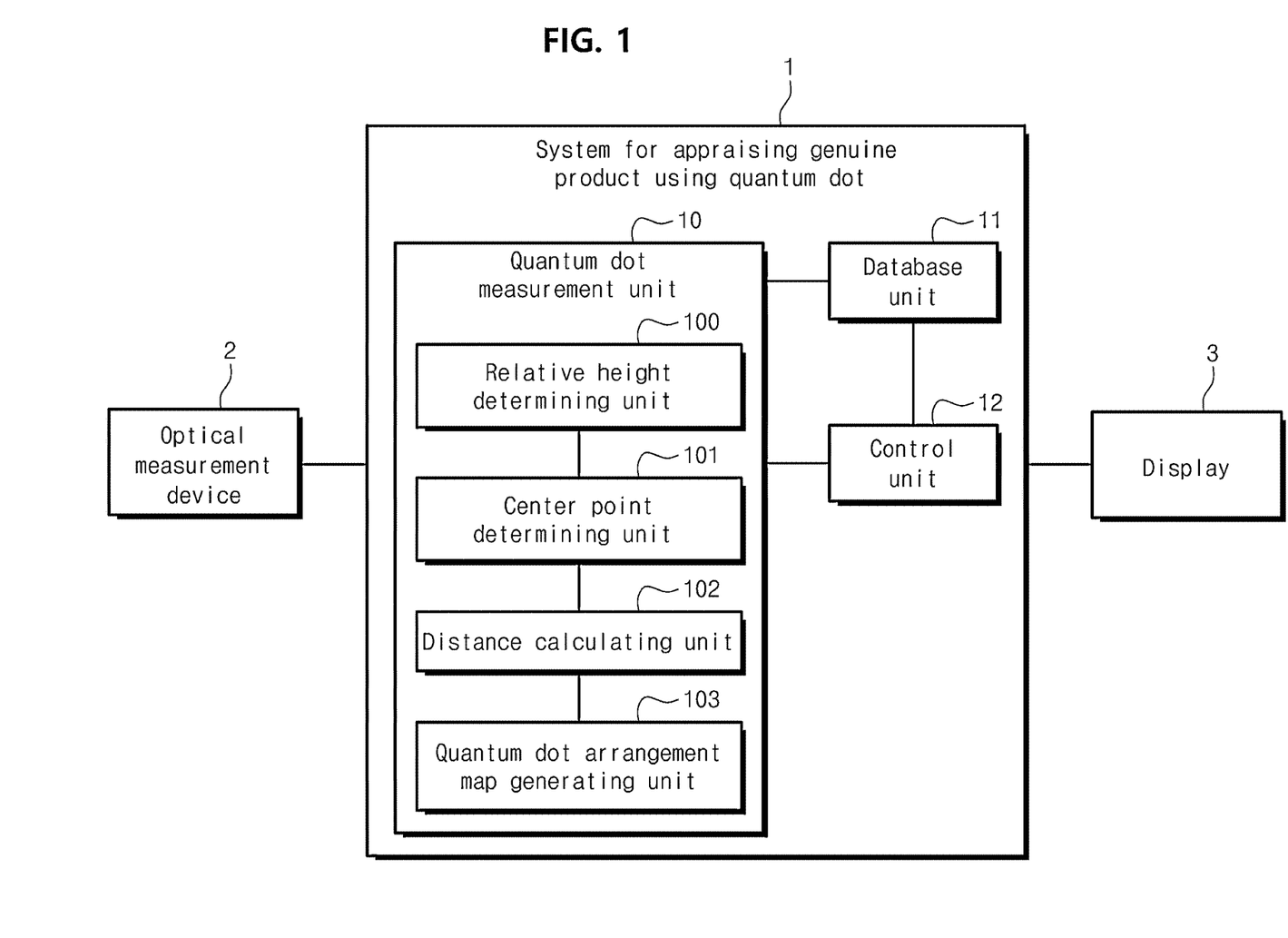
FIG. 1 is a block diagram illustrating a system for appraising a genuine product using a quantum dot, an optical measurement device, and a display according to an embodiment of the present disclosure.

FIG. 1 is a block diagram illustrating a system for appraising a genuine product using a quantum dot, an optical measurement device, and a display according to an embodiment of the present disclosure.

A system 1 for appraising a genuine product using a quantum dot according to an embodiment of the present disclosure may include at least one processor, and each of the at least one processor may include a quantum dot measurement unit 10, a database unit 11, and a control unit 12. The quantum dot measurement unit 10 may operate as a relative height determining unit 100, a center point determining unit 101, a distance calculating unit 102, and a quantum dot arrangement map generating unit 103.

The quantum dot measurement unit 10 may receive image data for fluorescence generated from a target product Tag (see FIG. 2) and a quantum dot layer Q (see FIG. 2) located in an area A (see FIG. 2) of the target product Tag by laser light Las (see FIG. 2) irradiated from an optical measurement device 2.

The optical measurement device 2 may correspond to a two-photon absorption microscope. The two-photon absorption microscope corresponding to the optical measurement device 2 may include a device capable of irradiating the laser light Las. The two-photon absorption microscope corresponding to the optical measurement device 2 may generate image data for a plurality of fluorescence generated from the quantum dot layer Q and the target product Tag.

Figure 2:
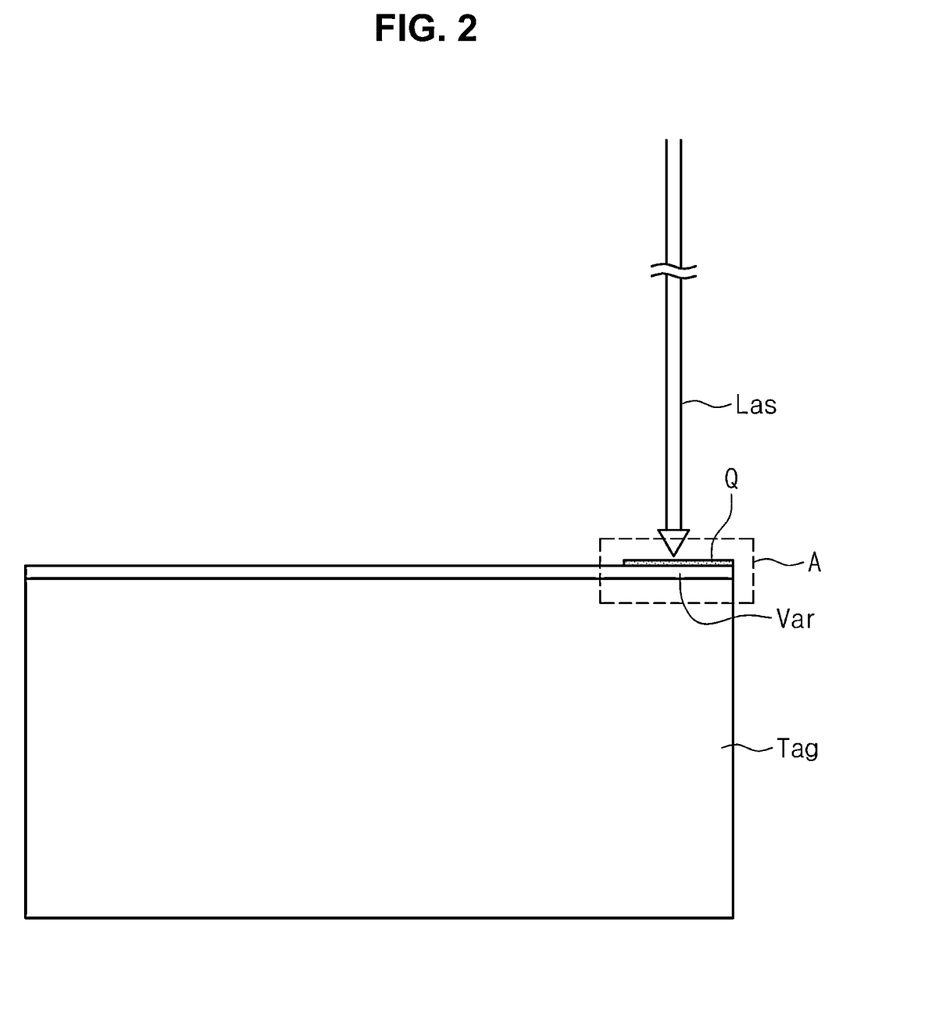
FIG. 2 is a diagram illustrating a process of obtaining image data for fluorescence by irradiating laser light on a target product and a quantum dot layer according to an embodiment of the present disclosure.

The optical measurement device 2 may irradiate the laser light Las toward the target product Tag and the quantum dot layer Q located in an area of the target product Tag. In this case, the laser light Las irradiated from the optical measurement device 2 may correspond to Femto seconds laser light having a wavelength of 800 nm When the laser light Las is irradiated from the optical measurement device 2, a material constituting the target product Tag and a plurality of quantum dots (hereinafter referred to as target quantum dots) constituting the quantum dot layer Q is excited to be in an excited state. Then, a two-photon absorption phenomenon in which fluorescence is emitted while changing to a ground state may occur.

The two-photon absorption microscope corresponding to the optical measurement device 2 may generate image data for fluorescence generated from the target product Tag and the quantum dot layer Q and provide the image data to the quantum dot measurement unit 10.

In this case, the image data generated from the optical measurement device 2 may include three-dimensional (3D) space image data composed of 3D images of the plurality of fluorescence generated from the target product Tag and the quantum dot layer Q and two-dimensional (2D) plane image data composed of 2D images of the plurality of fluorescence generated from the quantum dot layer Q.

The relative height determining unit 100 may measure wavelength values of a plurality of fluorescence in the 3D space image data. The relative height determining unit 100 may distinguish between fluorescence generated from the target product Tag and fluorescence generated from the quantum dot layer Q by using the measured wavelength values of the plurality of fluorescence.

In detail, the wavelength of fluorescence generated from the target product Tag and the wavelength of fluorescence generated from the quantum dot layer Q may be different from each other due to a two-photon absorption phenomenon. In this case, the relative height determining unit 100 may compare the wavelengths of the fluorescence generated from the target product Tag and the quantum dot layer Q to distinguish the fluorescence generated from the target product Tag from the fluorescence generated from the quantum dot layer Q.

The relative height determining unit 100 may set a plane containing the fluorescence generated from the target product Tag as a target plane.

The relative height determining unit 100 may compare the heights of the plurality of fluorescence generated from the quantum dot layer Q based on the target plane. The relative height determining unit 100 may determine the relative height between the plurality of fluorescence by using the heights of the plurality of fluorescence generated from the quantum dot layer Q based on the target plane.

For example, the relative height determining unit 100 may determine that the relative height of the first target quantum dot corresponding to the first fluorescence is greater than the relative height of the second target quantum dot corresponding to the second fluorescence when the height of the first fluorescence is greater than the height of the second fluorescence based on the target plane.

The center point determining unit 101 may determine the center point of fluorescence by using the 2D plane image data.

In detail, the center point determining unit 101 may measure fluorescence intensity (hereinafter, referred to as first fluorescence intensity) from each of a plurality of fluorescence in an arbitrary X-axis direction in the 2D plane image data.

In addition, the center point determining unit 101 may measure fluorescence intensity (hereinafter referred to as second fluorescence intensity) of each of a plurality of fluorescence in the Y-axis direction orthogonal to the X-axis in the 2D plane image data.

The center point determining unit 101 may determine, as a center point of each of the plurality of target quantum dots corresponding to the plurality of fluorescence, a point where a straight line extending an X value having the maximum value of the first fluorescence intensity in the Y-axis direction and a straight line extending an Y value having the maximum value of the second fluorescence intensity in the X-axis direction intersect.

For example, the center point determining unit 101 may measure the first fluorescence intensity in an arbitrary X-axis direction of the first fluorescence in the 2D plane image data. The center point determining unit 101 may measure the second fluorescence intensity in an arbitrary Y-axis direction of the second fluorescence in the 2D plane image data.

The center point determining unit 101 may determine, as a center point of the first target quantum dot corresponding to the first fluorescence, a point where a straight line extending an X value having the maximum value of the first fluorescence intensity in the Y-axis direction and a straight line extending an Y value having the maximum value of the second fluorescence intensity in the X-axis direction intersect.

The distance calculating unit 102 may connect center points of the plurality of fluorescence with a straight line. The distance calculating unit 102 may calculate the distance between the center points of the plurality of fluorescence by measuring the length of the straight line. The distance calculating unit 102 may determine the distance between the center points of the plurality of fluorescence as a relative distance.

For example, the distance calculating unit 102 may connect the first center point of the first fluorescence and the second center point of the second fluorescence with a straight line. The distance calculating unit 102 may calculate the length of the straight line connecting the first center point and the second center point. The distance calculating unit 102 may determine the length of the straight line connecting the first center point and the second center point as the relative distance between the first target quantum dot corresponding to the first fluorescence and the second target quantum dot corresponding to the second fluorescence.

The quantum dot arrangement map generating unit 103 may generate a quantum dot arrangement map in which an arrangement structure of a plurality of target quantum dots is expressed by using a relative height and a relative distance between the plurality of target quantum dots.

Specifically, the quantum dot arrangement map generating unit 103 may arrange a plurality of target quantum dots on an arbitrary 2D plane based on the relative distance. The quantum dot arrangement map generating unit 103 may number the plurality of target quantum dots arranged on an arbitrary plane according to their relative heights. The quantum dot arrangement map generating unit 103 may generate a quantum dot arrangement map by connecting the plurality of target quantum dots arranged on an arbitrary plane with a straight line.

For example, the quantum dot arrangement map generating unit 103 may arrange the first to third target quantum dots on an arbitrary 2D plane based on the relative distance. In this case, when the relative height of the first target quantum dot is higher than the relative height of the second target quantum dot, and the relative height of the second target quantum dot is higher than the relative height of the third target quantum dot, the quantum dot arrangement map generating unit 103 may number '1' to the first target quantum dot. The quantum dot arrangement map generating unit 103 may number '2' to the second target quantum dot. The quantum dot arrangement map generating unit 103 may number '3' to the third target quantum dot.

The quantum dot arrangement map generating unit 103 may generate a quantum dot arrangement map by connecting the first to third target quantum dots to each other with straight lines.

The quantum dot measurement unit 10 may provide the control unit 12 with data on the quantum dot arrangement map generated using the quantum dot layer Q located in one area of the target product Tag.

The database unit 11 may store a reference quantum dot arrangement map in advance. In this case, the reference quantum dot arrangement map corresponds to the quantum dot arrangement map generated using the quantum dot layer Q located in one area of the genuine product.

In this case, the reference quantum dot arrangement map previously stored in the database unit 11 may be represented as an arrangement structure of a plurality of quantum dots (hereinafter referred to as reference quantum dots) located in one area of the genuine product. The reference quantum dot arrangement map may be generated in the same manner as the above-mentioned quantum dot arrangement map of the target product, and may be expressed as a relative distance, relative height, and arrangement structure between a plurality of reference quantum dots.

The control unit 12 may receive data on the quantum dot arrangement map generated using the quantum dot layer Q located in one area A of the target product Tag from the quantum dot measurement unit 10. The control unit 12 may receive data on the reference quantum dot alignment map from the database unit 11.

The control unit 12 may determine whether the target product Tag is genuine by using the received data on the quantum dot arrangement map and the data on the reference quantum dot arrangement map.

In detail, the control unit 12 may compare the relative distance between the plurality of target quantum dots constituting the quantum dot arrangement map and the relative distance between the plurality of reference quantum dots constituting the reference quantum dot arrangement map.

In addition, the control unit 12 may compare the relative height between the plurality of target quantum dots constituting the quantum dot arrangement map and the relative height between the plurality of reference quantum dots constituting the reference quantum dot arrangement map.

In detail, the control unit 12 may determine that the target product as a counterfeit product when at least one of the relative distances between the plurality of reference quantum dots corresponding to the plurality of target quantum dots is not the same as the relative distances between the plurality of target quantum dots.

The control unit 12 may determine the target product as a counterfeit product when at least one of the relative heights between the plurality of reference quantum dots corresponding to the plurality of target quantum dots is not the same as the relative heights between the plurality of target quantum dots.

The control unit 12 may determine the target product as a genuine product when all of the relative distances and heights between the plurality of target quantum dots and the relative distances and heights between the plurality of reference quantum dots corresponding to the plurality of target quantum dots are the same.

A display 3 may output the quantum dot arrangement map of the target product Tag based on a control signal of the control unit 12. The display 3 may output that the target product Tag corresponds to a counterfeit product based on the control signal of the control unit 12. The display 3 may output that the target product Tag corresponds to a genuine product based on the control signal of the control unit 12.

FIG. 2 is a diagram illustrating a process of obtaining image data for fluorescence by irradiating laser light on a target product and a quantum dot layer according to an embodiment of the present disclosure.

Hereinafter, in FIG. 2, the embodiment will be described assuming that the target product Tag is a work of art. Acrylic varnish Var may be applied to the upper surface of the target product Tag.

The acrylic varnish Var may mean a paint that forms a glossy transparent film, and form a thin film on the surface of the target product Tag to give gloss and prevent moisture. In general, it is used to protect the surface of an artwork or the like. The acrylic varnish Var may have a thickness of 20 to 30 μm.

The quantum dot layer Q formed of a diluted quantum dot solution may be formed by over-painting one area A of the target product Tag on the upper surface of the acrylic varnish Var. Alternatively, the quantum dot layer Q may be generated by mixing a diluted quantum dot solution with acrylic varnish Var and painting over one area A of the target product Tag. In this case, while the quantum dot layer Q and the acrylic varnish Var are solidified, the plurality of target quantum dots included in the quantum dot layer Q may have an arbitrary arrangement having an infinite number of cases.

The optical measurement device 2 may be positioned over the quantum dot layer Q and/or the acrylic varnish Var, and vertically irradiate the laser light Las onto the quantum dot layer Q, the acrylic varnish Var and the target product Tag.

The laser light Las irradiated from the optical measurement device 2 may penetrate the quantum dot layer Q and the acrylic varnish Var, and reach the surface of the target product Tag in some cases.

In the material constituting the plurality of target quantum dots constituting the quantum dot layer Q and the target product Tag, two-photon phenomenon that emits fluorescence while changing to the ground state after being excited into the excited state may occur by the laser light Las.

In detail, the depth spatial resolution of the laser light Las irradiated from the optical measurement device 2 may correspond to 2 μm. Therefore, fluorescence may be generated by the laser light Las at the plurality of target quantum dots present on the inside or upper surface of the acrylic varnish Var having a thickness of 20 to 30 μm.

The two-photon absorption microscope corresponding to the optical measurement device 2 may absorb the fluorescence generated from the plurality of target quantum dots constituting the quantum dot layer Q and the material constituting the target product Tag to obtain image data for the fluorescence.

In FIG. 2, the target product Tag, which is the subject of the appraisal of a genuine product, has been described as an example, but the same applies to genuine products.

For example, in the case of a genuine product, image data for fluorescence may be obtained in the same manner as the above-described process, and a reference quantum dot arrangement map may be generated based on the image data and stored in the database unit 11 in advance.

Because the system 1 for appraising a genuine product using a quantum dot according to an embodiment of the present disclosure applies the diluted quantum dot solution only to one area A of the target product Tag and/or the genuine product and uses the same, the time required for appraising a genuine product may be reduced.

In addition, because one area A of the target product Tag and/or of the genuine product is simply coated with a diluted quantum dot solution and the appraisal of a genuine product is performed using this, cost may be reduced in terms of economy.

In addition, as soon as the diluted quantum dot solution is simply overlaid on one area A of the acrylic varnish Var and solidified, the plurality of quantum dots included in the quantum dot layer Q may be arbitrarily arranged according to an infinite number of cases, so that it is possible to improve the accuracy of appraisal of a genuine product and suppress the production of counterfeit or duplicate products.

In addition, because the wavelength of the laser light Las measured by the optical measurement device 2 corresponds to 800 nm and the thickness of the acrylic varnish Var corresponds to 20 to 30 um, it is possible to minimize damage by minimizing the laser light Las.

Figure 3:
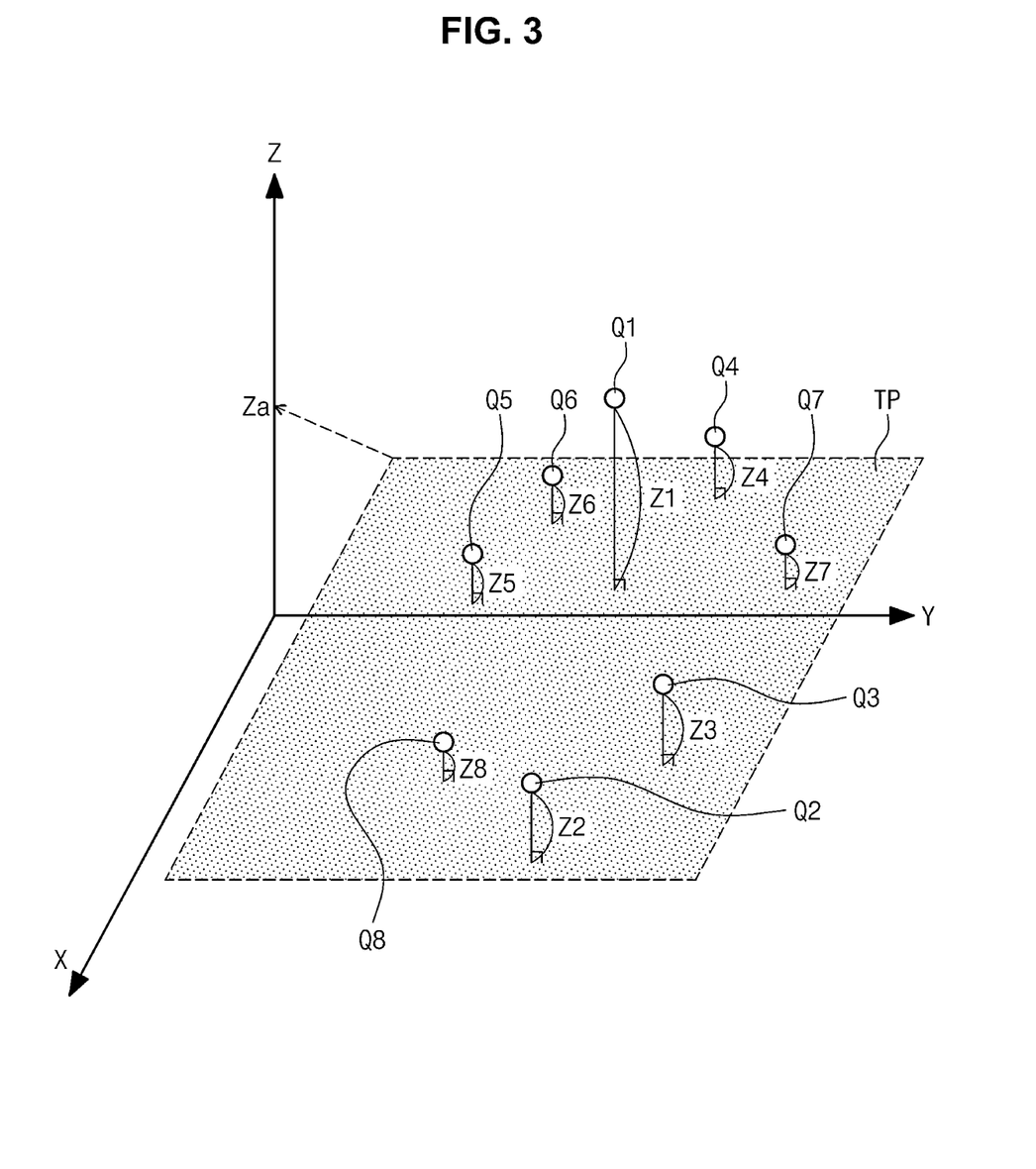
FIG. 3 is a diagram illustrating a process of determining a relative height between a plurality of target quantum dots according to an embodiment of the present disclosure.

FIG. 3 is a diagram illustrating a process of determining a relative height between a plurality of target quantum dots according to an embodiment of the present disclosure.

Referring to FIG. 3, the quantum dot measurement unit 10 may receive 3D space image data composed of 3D images of a plurality of fluorescence generated from the target product Tag and the quantum dot layer Q from the optical measurement device 2.

The relative height determining unit 100 may measure the wavelength values of a plurality of fluorescence. The relative height determining unit 100 may distinguish between fluorescence generated from the target product Tag and fluorescence generated from the quantum dot layer Q by using the measured wavelength value.

The relative height determining unit 100 may set a plane containing the fluorescence generated from the target product Tag as a target plane TP. The relative height determining unit 100 may compare the heights of a plurality of fluorescence based on a Z-axis height Za of the target plane TP.

The relative height determining unit 100 may calculate the height from the target plane TP to the first target quantum dot as Z1. The relative height determining unit 100 may calculate the height from the target plane TP to the second target quantum dot as Z2. The relative height determining unit 100 may calculate the height from the target plane TP to the third target quantum dot as Z3. The relative height determining unit 100 may calculate the height from the target plane TP to the fourth target quantum dot as Z4.

The relative height determining unit 100 may calculate the height from the target plane TP to the fifth target quantum dot as Z5. The relative height determining unit 100 may calculate the height from the target plane TP to the sixth target quantum dot as Z6. The relative height determining unit 100 may calculate the height from the target plane TP to the seventh target quantum dot as Z7. The relative height determining unit 100 may calculate the height from the target plane TP to the eighth target quantum dot as Z8.

The relative height determining unit 100 may determine that the relative height of the first target quantum dot is higher than the relative height of the second target quantum dot with respect to the target plane TP. The relative height determining unit 100 may determine that the relative height of the second target quantum dot is higher than the relative height of the third target quantum dot with respect to the target plane TP. The relative height determining unit 100 may determine that the relative height of the third target quantum dot is higher than the relative height of the fourth target quantum dot with respect to the target plane TP.

The relative height determining unit 100 may determine that the relative height of the fourth target quantum dot is higher than the relative height of the fifth target quantum dot with respect to the target plane TP. The relative height determining unit 100 may determine that the relative height of the fifth target quantum dot is higher than the relative height of the sixth target quantum dot with respect to the target plane TP. The relative height determining unit 100 may determine that the relative height of the sixth target quantum dot is higher than the relative height of the seventh target quantum dot with respect to the target plane TP. The relative height determining unit 100 may determine that the relative height of the seventh target quantum dot is higher than the relative height of the eighth target quantum dot with respect to the target plane TP.

Figure 4:
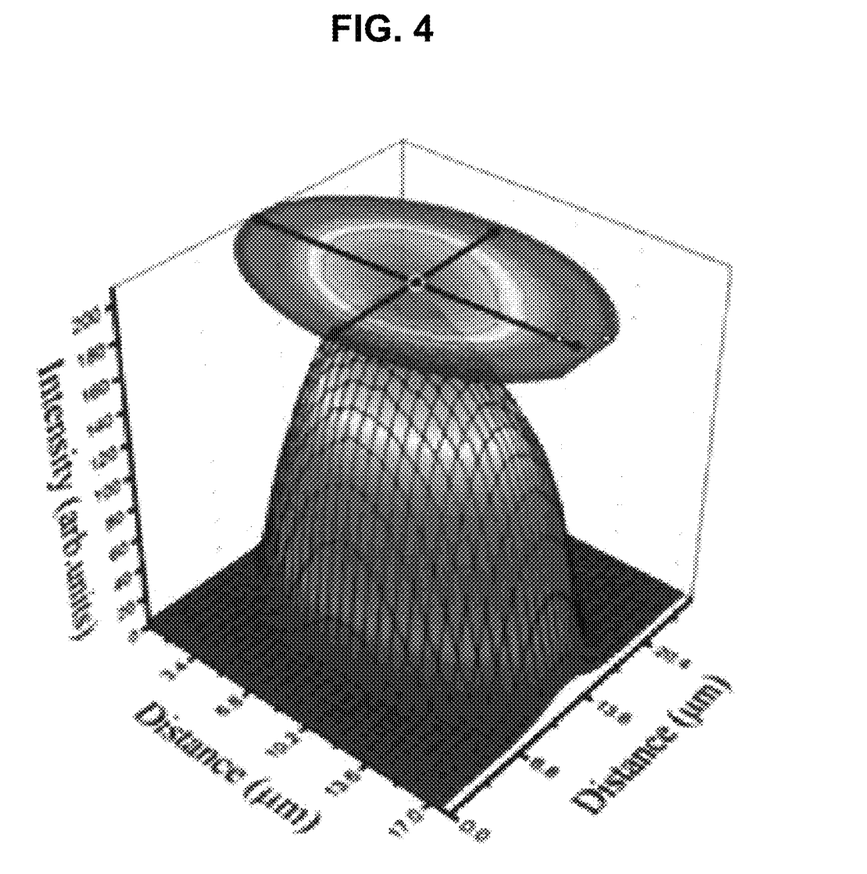
FIG. 4 is a diagram illustrating a process of determining the center point of each of a plurality of target quantum dots according to an embodiment of the present disclosure.

FIG. 4 is a diagram illustrating a process of determining the center point of each of a plurality of target quantum dots according to an embodiment of the present disclosure.

The quantum dot measurement unit 10 may receive 2D plane image data composed of 2D images of the plurality of fluorescence generated from the quantum dot layer Q from the optical measurement device 2.

Referring to FIG. 4, one target quantum dot included in the 2D plane image data will be described as an example.

The center point determining unit 101 may measure the first fluorescence intensity of one target quantum dot in the X-axis direction in the 2D plane image data.

In detail, the first fluorescence intensity increases as it approaches the center (10.2 μm) of fluorescence in the X-axis direction, and decreases as it moves away from the center (10.2 μm).

The center point determining unit 101 may measure the second fluorescence intensity of one target quantum dot in the Y-axis direction in the 2D plane image data.

In detail, the second fluorescence intensity increases as it approaches the center (13.8 μm) of fluorescence in the Y-axis direction, and decreases as it moves away from the center (13.8 μm).

The center point determining unit 101 may determine, as the center point "C" of the target quantum dot, a point where a straight line extending an X value (10.2 μm) having the maximum value of the first fluorescence intensity in the Y-axis direction and a straight line extending an Y value (13.8 μm) having the maximum value of the second fluorescence intensity in the X-axis direction intersect.

Figure 5:
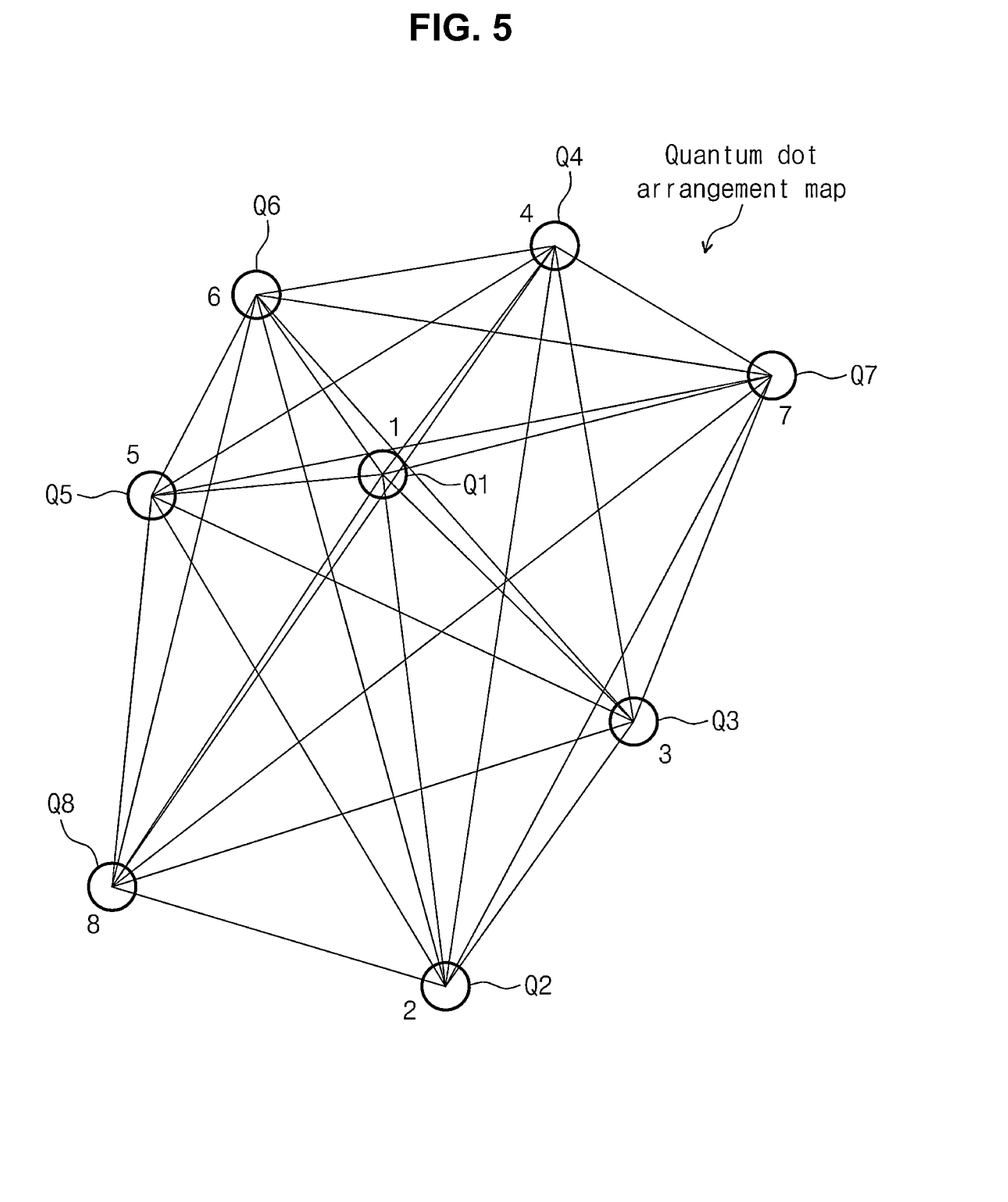
FIG. 5 is a diagram illustrating a process of determining a relative distance between a plurality of target quantum dots and generating a quantum dot arrangement map according to an embodiment of the present disclosure.

FIG. 5 is a diagram illustrating a process of determining a relative distance between a plurality of target quantum dots and generating a quantum dot arrangement map according to an embodiment of the present disclosure.

Referring to FIG. 5, the quantum dot arrangement map generating unit 103 may receive relative heights between the plurality of target quantum dots from the relative height determining unit 100. The quantum dot arrangement map generating unit 103 may receive relative distances between the plurality of target quantum dots from the distance calculating unit 102.

The quantum dot arrangement map generating unit 103 may use the relative distances between the plurality of target quantum dots provided from the distance calculating unit 102 to arrange the plurality of target quantum dots Q1 to Q8 on an arbitrary 2D plane.

In this case, because the plurality of target quantum dots Q1 to Q8 are arranged on an arbitrary plane by using relative distances, it is possible to understand the positional relationship and arrangement structure among Q1 to Q8.

In addition, the quantum dot arrangement map generating unit 103 may number the plurality of target quantum dots Q1 to Q8 arranged on an arbitrary plane according to their relative heights.

Referring to FIG. 5, because the relative height of the first target quantum dot Q1 is the highest, the quantum dot arrangement map generating unit 103 may number '1' to the first target quantum dot Q1. Because the relative height of the eighth target quantum dot Q8 is the lowest, the quantum dot arrangement map generating unit 103 may number '8' to the eighth target quantum dot Q8.

The quantum dot arrangement map generating unit 103 may generate a quantum dot arrangement map by connecting the plurality of target quantum dots Q1, Q2 to Q8 with straight lines.

As described above with reference to FIG. 2, the database unit 11 may store in advance data on the reference quantum dot arrangement map generated using the genuine product and the quantum dot layer Q overlaid on one area of the genuine product.

The quantum dot measurement unit 10 may provide the above-described data on the quantum dot arrangement map to the control unit 12. The database unit 11 may provide the control unit 12 with data on the above-described reference quantum dot arrangement map.

The control unit 12 may compare the number of target quantum dots with the number of reference quantum dots. The control unit 12 may compare the positional relationship according to the relative distance between the target quantum dots and the positional relationship according to the relative distance between the reference quantum dots. The control unit 12 may compare the numbers numbered according to the relative heights of the target quantum dots with the numbers numbered according to the relative heights of the reference quantum dots. The control unit 12 may compare a connection relationship according to the straight line connected between target quantum dots and a connection relationship according to a straight line connected between reference quantum dots.

As described above, the control unit 12 may determine whether the target product Tag is genuine by comparing the data on the quantum dot arrangement map with the data on the reference quantum dot arrangement map.

Figure 6:
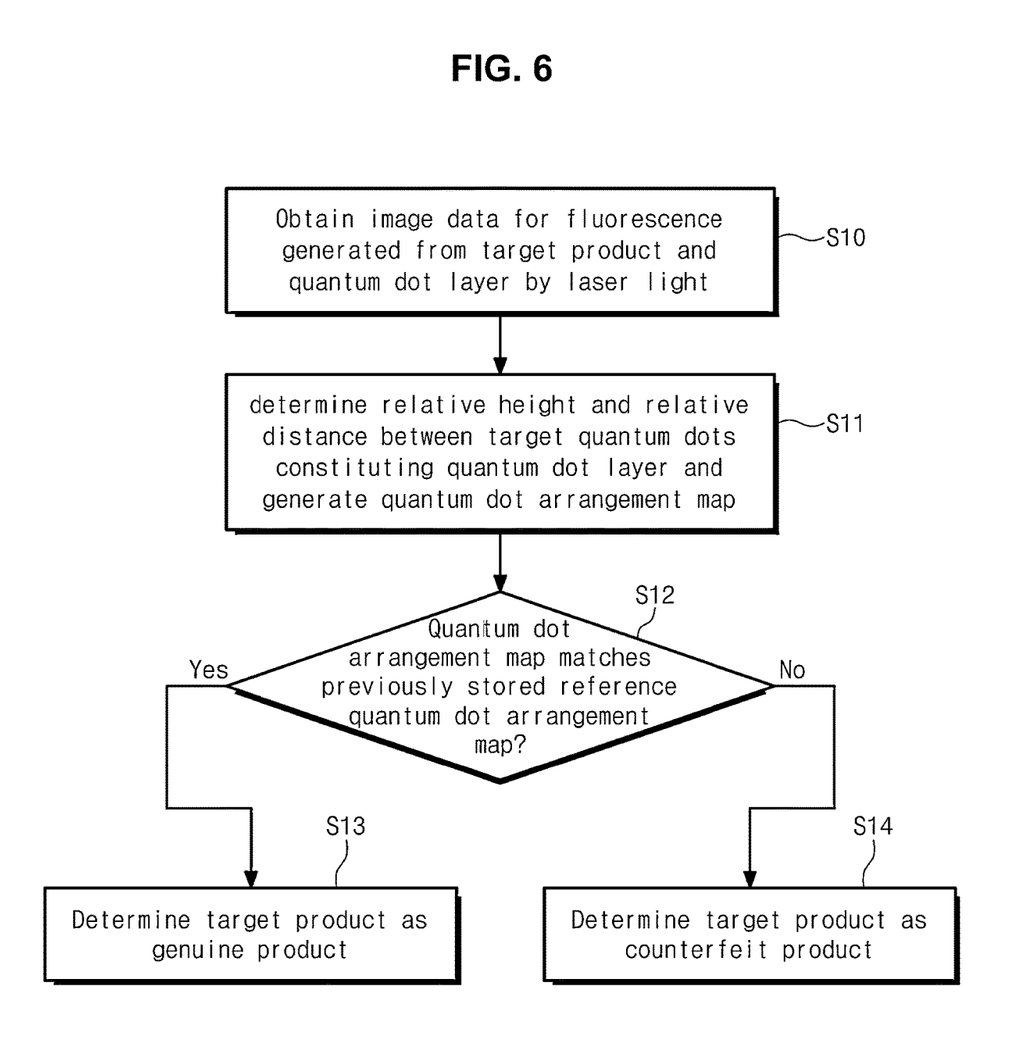
FIG. 6 is a flowchart illustrating a method of appraising a genuine product using a quantum dot according to an embodiment of the present disclosure.

FIG. 6 is a flowchart illustrating a method of appraising a genuine product using a quantum dot according to an embodiment of the present disclosure.

In operation S10, image data for fluorescence generated from the target product and the quantum dot layer by the laser light is obtained.

Specifically, the quantum dot measurement unit 10 may receive image data on a plurality of fluorescence generated from the layer Q, which is located in a target product Tag, by the laser light Las irradiated from the optical measurement device.

In operation S11, the relative height and relative distance between the target quantum dots constituting the quantum dot layer are determined, and the quantum dot arrangement map is generated.

Specifically, the relative height determining unit 100 may distinguish between the fluorescence generated from the target product Tag and the fluorescence generated from the quantum dot layer Q by using wavelength values of the plurality of fluorescence.

The relative height determining unit 100 may set the plane containing the fluorescence generated from the target product Tag as the target plane TP. The relative height determining unit 100 may determine the relative height between the plurality of fluorescence by using the heights from the target plane TP to the plurality of fluorescence generated from the quantum dot layer Q.

The center point determining unit 101 may determine the center point "C" of the plurality of fluorescence by using the 2D plane image data.

The distance calculating unit 102 may determine the distance between the center points "C" of the plurality of fluorescence as the relative distance.

The quantum dot arrangement map generating unit 103 may generate the quantum dot arrangement map in which the arrangement structure of the plurality of target quantum dots is expressed using the relative height and the relative distance between the plurality of target quantum dots.

In operation S12, it is determined whether the quantum dot arrangement map matches the previously stored reference quantum dot arrangement map.

Specifically, the control unit 12 may determine whether the target product Tag is genuine by using the received data on the quantum dot arrangement map and the data on the reference quantum dot arrangement map.

In operation S13, it is determined that the target product is genuine.

Specifically, the control unit 12 determines that the target product Tag is genuine when both the relative distance and relative height between the plurality of target quantum dots and the relative distance and relative height between the plurality of reference quantum dots corresponding to the plurality of target quantum dots are the same.

In operation S14, it is determined that the target product is counterfeit.

In detail, the control unit 12 may determine the target product Tag as a counterfeit product when at least one of the relative distances between the plurality of reference quantum dots corresponding to the plurality of target quantum dots is not the same as the relative distances between the plurality of target quantum dots.

The control unit 12 may determine the target product Tag as a counterfeit product when at least one of the relative heights between the plurality of reference quantum dots corresponding to the plurality of target quantum dots is not the same as the relative heights between the plurality of target quantum dots.

The foregoing embodiments may be realized by hardware elements, software elements and/or combinations thereof. For example, the devices, methods and components illustrated in the exemplary embodiments of the present disclosure may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond.

A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements.

For example, the processing unit may include a plurality of processors or one processor and one controller. Also, the processing unit may have a different processing configuration, such as a parallel processor. Software may include computer programs, codes, instructions or one or more combinations thereof and may configure a processing unit to operate in a desired manner or may independently or collectively control the processing unit.

Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the present disclosure may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the present disclosure or be known and available to those skilled in computer software.

Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the present disclosure, or vice versa.

The drawings and detailed description of the present disclosure referred to so far are merely illustrative of the present disclosure, but they are only used for the purpose of describing the embodiments and are not used to limit the meaning or scope of the present disclosure described in the claims. Therefore, it will be understood by those skilled in the art that various modifications and equivalent other embodiments of the present disclosure are possible therefrom. Accordingly, the true technical scope of the present disclosure should be defined by the technical spirit of the appended claims.

What is claimed is:

1. A method of appraising a genuine product using a quantum dot by a genuine product appraisal system using a quantum dot which includes at least one processor, the method comprising:
    obtaining, by the at least one processor, image data for fluorescence generated from a target product and a quantum dot layer located in one region of the target product by laser light;
    determining, by the at least one processor, a relative height and a relative distance between target quantum dots constituting the quantum dot layer by using the image data for the fluorescence, and generating a quantum dot arrangement map; and
    determining, by the at least one processor, whether the target product is genuine by comparing the quantum dot arrangement map with a previously stored reference quantum dot arrangement map,
    wherein the image data for the fluorescence includes three-dimensional (3D) spatial image data including three-dimensional images of the fluorescence generated from the target product and the quantum dot layer; and
    two-dimensional (2D) plane image data including a 2D image for the fluorescence generated from the quantum dot layer.

2. The method of claim 1, wherein the generating of the quantum dot arrangement map includes:
    measuring, by the at least one processor, a wavelength value of the fluorescence in the 3D spatial image data;
    distinguishing, by the at least one processor, the fluorescence generated from the target product and the fluorescence generated from the quantum dot layer by using the wavelength value; and setting, by the at least one processor, a plane including the fluorescence generated from the target product as a target plane.

3. The method of claim 2, wherein the determining of the relative height includes:
comparing, by the at least one processor, heights of a plurality of fluorescence generated from the quantum dot layer based on the target plane; and
determining, by the at least one processor, relative heights between a plurality of target quantum dots corresponding to the plurality of fluorescence based on the compared heights.

4. The method of claim 2, wherein the determining of the relative distance includes:
measuring, by the at least one processor, a first fluorescence intensity from each of the plurality of fluorescence in an arbitrary X-axis direction in the 2D plane image data;
measuring, by the at least one processor, a second fluorescence intensity from each of the plurality of fluorescence in an Y-axis direction orthogonal to the X-axis in the 2D plane image data; and
determining, by the at least one processor, as a center point of each of the plurality of target quantum dots, a point where a straight line extending an X value having a maximum value of the first fluorescence intensity in the Y-axis direction and a straight line extending an Y value having a maximum value of the second fluorescence intensity in the X-axis direction intersect.

5. The method of claim 4, wherein the determining of the relative distance includes:
connecting, by the at least one processor, center points with a straight line;
measuring, by the at least one processor, a length of the straight line; and
determining, by the at least one processor, the length as the relative distance.

6. The method of claim 2, wherein the generating of the quantum dot arrangement map includes:
arranging, by the at least one processor, a plurality of target quantum dots on an arbitrary 2D plane according to the relative distance;
numbering, by the at least one processor, the plurality of arranged target quantum dots according to the relative height; and
generating, by the at least one processor, the quantum dot arrangement map by connecting the plurality of target quantum dots with a straight line.

7. The method of claim 1, wherein the previously stored reference quantum dot arrangement map is generated by using the image data for the fluorescence generated from the genuine product and a quantum dot layer located in one region of the genuine product by the at least one processor.

8. The method of claim 7, wherein the determining of whether the target product is genuine includes:
comparing, by the at least one processor, a relative distance between a plurality of target quantum dots constituting the quantum dot arrangement map and a relative distance between a plurality of reference quantum dots constituting the reference quantum dot arrangement map; and
comparing, by the at least one processor, a relative height between the plurality of target quantum dots constituting the quantum dot arrangement map and a relative height between the plurality of reference quantum dots constituting the reference quantum dot arrangement map.

9. The method of claim 8, wherein the determining of whether the target product is genuine includes:
determining, by the at least one processor, the target product as the genuine product when the relative distance between the plurality of target quantum dots is equal to the relative distance between the plurality of reference quantum dots corresponding to the plurality of target quantum dots.

10. The method of claim 8, wherein the determining of whether the target product is genuine includes:
determining, by the at least one processor, the target product as a counterfeit product when the relative distance between the plurality of target quantum dots is different from the relative distance between the plurality of reference quantum dots corresponding to the plurality of target quantum dots.

11. The method of claim 8, wherein the determining of whether the target product is genuine includes:
determining, by the at least one processor, the target product as a counterfeit product when the relative height between the plurality of target quantum dots is different from at least one of relative heights between the plurality of reference quantum dots corresponding to the plurality of target quantum dots.

12. A system for appraising a genuine product using a quantum dot, the system comprising at least one processor, wherein the at least one processor includes:
an input unit configured to receive image data for fluorescence generated from a target product and a quantum dot layer located in one region of the target product by laser light;
a relative height determining unit configured to determine a relative height between target quantum dots constituting the quantum dot layer by using the image data;
a distance calculating unit configured to calculate a relative distance between the target quantum dots by using the image data;
a quantum dot arrangement map generating unit configured to generate a quantum dot arrangement map expressing an arrangement structure of the target quantum dots by using the relative height and the relative distance; and
a control unit configured to compare the quantum dot arrangement map with an arrangement structure of a previously stored reference quantum dot arrangement map to determine whether the target product is genuine.

13. A computer-readable non-transitory recording medium on which a program for executing the method of appraising a genuine product using a quantum dot of claim 1 is recorded.

* * * * *